United States Patent [19]

Ott

[11] 4,321,079

[45] Mar. 23, 1982

[54] AQUEOUS SULFUR DISPERSION HAVING REDUCED CORROSIVE ACTIVITY TOWARD FERROUS METAL

[75] Inventor: Louis E. Ott, Oswego, Ill.

[73] Assignee: Standard Oil Company (Indiana), Chicago, Ill.

[21] Appl. No.: 151,882

[22] Filed: May 21, 1980

Related U.S. Application Data

[62] Division of Ser. No. 969,487, Dec. 14, 1978, Pat. No. 4,256,691.

[51] Int. Cl.$^3$ ................................................ C05C 3/00
[52] U.S. Cl. .................................. 71/61; 71/DIG. 4; 71/64.08; 423/567 R; 252/389 R
[58] Field of Search .............. 71/1, 11, 61, 64 C, 71/DIG. 4, 64.8, 64.10; 252/389 R; 422/7, 12; 423/567, DIG. 8

[56] References Cited

U.S. PATENT DOCUMENTS

| | | | |
|---|---|---|---|
| 3,798,020 | 3/1974 | Parham, Jr. et al. | 71/64 C X |
| 3,799,884 | 3/1974 | Young | 71/64 C X |
| 4,033,747 | 7/1977 | Young | 71/64 C X |
| 4,219,348 | 8/1980 | Parham, Jr. et al. | 71/64 C X |

Primary Examiner—S. Leon Bashore
Assistant Examiner—Ferris H. Lander
Attorney, Agent, or Firm—Richard A. Kretchmer; William T. McClain; William H. Magidson

[57] ABSTRACT

A dispersion of up to about 70 weight percent elemental sulfur in an aqueous ammonia solution of at least one metal compound selected from the group consisting of soluble zinc and magnesium compounds has reduced corrosive activity toward ferrous metal. The atomic ratio of zinc and/or magnesium to sulfur is from about 0.0002 to about 0.1 and the mole ratio of ammonia to metal compound is from about 0.1 to about 200.

12 Claims, No Drawings

AQUEOUS SULFUR DISPERSION HAVING REDUCED CORROSIVE ACTIVITY TOWARD FERROUS METAL

This is a division, of application Ser. No. 969,487, filed Dec. 14, 1978 now U.S. Pat. No. 4,256,691, Mar. 17, 1981.

BACKGROUND OF THE INVENTION

1. Field of the Invention

This invention relates to an aqueous dispersion of elemental sulfur which has a reduced corrosive activity toward ferrous metal. More particularly, it relates to an aqueous sulfur dispersion which contains ammonia and at least one metal compound selected from the group consisting of soluble zinc and magnesium compounds dissolved in the aqueous phase.

2. Description of the Prior Art

Plants require a variety of materials for adequate nutrition. The principal materials are carbon dioxide and water, which provide the elements of carbon, hydrogen and oxygen, and which are usually available in adequate amounts from both soil and atmosphere. The supply of carbon dioxide and water is continually replenished by natural phenomena. All the other essential nutrients are normally available from the soil, but they are not replenished by nature after the plant takes them up into its foliage and fruit. When the plant is removed for the soil for consumption, in contrast to the natural cycle of return to the soil, the soil nutrient supply is reduced, and the application of fertilizer becomes necessary in time.

Thirteen elements, which are normally drawn from the soil, are currently known to be essential to plant nutrition. These elements consist of nitrogen, phosphorus, potassium, calcium, magnesium, sulfur, iron, manganese, copper, zinc, boron, molybdenum and chlorine. Of these thirteen elements, nitrogen, phosphorus and potassium are needed by plants in relatively large quantities and are therefore called macronutrients. Calcium, magnesium, and sulfur are generally required in lesser but still substantial amounts and are classified as secondary nutrients. The remaining members of the group are known as micronutrients since they are required in very small amounts for plant growth.

Plants obtain sulfur from both the soil and the air. In the soil, sulfur is ordinarily present either in the form of sulfur containing inorganic minerals or as organic sulfur compounds in the soil organic matter or humus. In the air, sulfur is primarily present in the form of sulfur dioxide which can be directly absorbed by the leaves of plants. In addition, sulfur dioxide from the air is also carried into the soil by rain water where it may be absorbed by plants.

The discharge of sulfur oxides into the air by some large industrial centers is sufficiently large to ensure that a sulfur deficiency does not develop in nearby agricultural land. This, however, is not the case for agricultural land which is remote from such sources of atmospheric sulfur oxides. In view of limitations on the natural supply of sulfur from both air and soil, a sulfur deficiency is not uncommon in agricultural soils. Such a deficiency frequently occurs in well-leached soils containing little organic matter which are located in areas far from sources of sulfur dioxide atmospheric pollution. Crops which appear to be particularly sensitive to a sulfur deficiency include corn, sugar cane, wheat, sugar beets, and legumes such as alfalfa and peanuts.

One of the most satisfactory sources of sulfur for fertilizer purposes is elemental sulfur. Although elemental sulfur cannot be directly utilized by plants, it is slowly oxidized by microorganisms in the soil to sulfate which can be metabolized by plants. In view of the water insolubility of elemental sulfur, it serves as a highly effective slow release source of sulfur for plant nutrition which is not susceptible to leaching by rain water or irrigation. In addition to its suitability as a fertilizer, elemental sulfur is also an excellent fungicide and is widely used in agriculture for this purpose.

Elemental sulfur can be applied either to soil or plants as a dry solid. It is frequently preferable, however, to apply elemental sulfur in the form of an aqueous dispersion since a dispersion avoids the hazards associated with dust formation. In addition, an aqueous sulfur dispersion can be applied with conventional spray equipment and can be diluted to any desired concentration with water. Further, an aqueous sulfur dispersion can be readily blended with other liquid fertilizers. The preparation of a conventional aqueous sulfur dispersion is set forth in U.S. Pat. No. 2,348,736.

The use of aqueous dispersions of elemental sulfur has been hampered, however, as a consequence of their highly corrosive action with respect to ferrous metal, such as carbon steel. In the past, the use of these dispersions has required the use of storage and application equipment which is constructed of stainless steel, high chromium steel, or certain plastics.

U.S. Pat. Nos. 3,854,923; 3,909,229; and 3,997,319 are directed to a micronutrient composition consisting of a solution in anhydrous or aqueous ammonia of a zinc alkanoate which contains from 1 to 6 carbon atoms. These patents teach that the zinc salts of low molecular weight alkanoic acids are desirable sources of zinc for use in combination with ammonia as a consequence of their relatively high solubility in aqueous or anhydrous ammonia. These patents do not, however, suggest, for any purpose, the combination of an aqueous dispersion of elemental sulfur with a solution in aqueous ammonia of at least one soluble zinc and/or magnesium compound.

Similarly, U.S. Pat. No. 4,007,029 discloses the preparation and use of a liquid fertilizer composition which comprises anhydrous ammonia, at least one trace element selected from the group consisting of boron, copper, magnesium, manganese and molybdenum, and wherein a compound such as ammonium acetate, magnesium acetate or sodium acetate may be used to solubilize the trace element. This patent fails to suggest, for any purpose, the combination of an aqueous dispersion of elemental sulfur with a solution in aqueous ammonia of at least one soluble zinc and/or magnesium compound.

In addition, U.S. Pat. No. 2,957,762 discloses the use of a water-soluble stable ammine complex salt of a metal selected from Groups Ib, IIb, VIa, and VIII of the Periodic Table to inhibit the corrosive activity toward ferrous metal of aqueous ammonia solutions of ammonium salts of strong mineral acids. This patent, however, fails to suggest that any material or combination of materials could be used to reduce the corrosive activity of an aqueous dispersion of elemental sulfur.

SUMMARY OF THE INVENTION

It has been discovered that the corrosion of ferrous metal by aqueous dispersions of elemental sulfur can be reduced if the aqueous phase of the dispersion contains dissolved therein an effective amount of a combination of ammonia and at least one metal compound selected from the group consisting of soluble zinc and magnesium compounds. Accordingly, it is an object of this invention to provide a method for reducing the corrosion of ferrous metal which is exposed to an aqueous dispersion of elemental sulfur. A further object is to provide an aqueous dispersion of elemental sulfur which has a reduced corrosive activity toward ferrous metal. A still further object is to provide an improved fertilizer composition. Other objectives, aspects and advantages will be readily apparent from the following description and claims.

DETAILED DESCRIPTION OF THE INVENTION

The aqueous sulfur dispersion of this invention comprises from about 1 to about 70 weight percent of finely divided elemental sulfur which is dispersed in an aqueous medium. A sulfur concentration of from about 30 to about 70 weight percent is frequently preferable, however, since the transportation and storage of sulfur is more efficient at these higher concentrations. The concentrated dispersion may then be diluted to any desired concentration at the point of use either with water or with aqueous fertilizer solutions.

The particles of finely divided sulfur in the dispersion has an average diameter of between about 0.1 and about 10 microns. An average diameter of between about 1 and about 5 microns is preferred, however, because of the relative ease of preparation and the stability of the resulting dispersion.

The aqueous dispersion of elemental sulfur can be prepared according to any of the conventional methods known to the art and can contain any of the conventional additives such as wetting and dispersing agents, protective colloids, and thickening agents. Conventional wetting and dispersing agents include compounds such as sodium monobutylphenylphenolmonosulfonate, sodium alkylnaphthalenesulfonate, sodium monobutyldiphenylsulfonate, sodium dibutylphenylphenoldisulfonate, naphthalenesulfonic acid, and sodium lauryl sulfate. The amount of dispersing agent frequently ranges from about 0.1 to about 2 percent by weight based on the weight of elemental sulfur in the dispersion. Conventional protective cooloids include materials such as dextrin, gum arabic, tragacanth, agar, pectin, and glue. Conventional thickening agents include attapulgite and bentonite clays.

The corrosive action toward ferrous metal of an aqueous sulfur dispersion is reduced according to this invention if the aqueous phase of the dispersion contains dissolved therein an effective amount of a combination of ammonia and at least one metal compound selected from the group consisting of soluble zinc and magnesium compounds. A basic dispersion having a pH of at least about 8.0, preferably of at least about 9.0, and having an atomic ratio of metal to sulfur in excess of about 0.0002 exhibits a reduced corrosive activity. The atomic ratio of metal to sulfur, however, is preferably in excess of about 0.001 and more preferably in excess of about 0.002 since the reduction of corrosive activity is more pronounced as this ratio increases. The atomic ratio of metal to sulfur need not ordinarily exceed about 0.1 and is preferably not in excess of about 0.05.

The ammonia content of the sulfur dispersion of this invention is such that the moles of ammonia per gram-atom of metal from the metal compound is from about 0.1 to about 200 and preferably from about 1 to about 6. A very large ratio does not have a detrimental effect on the inhibition of corrosion but may render the handling of such solutions unpleasant because of the irritating effect on eyes and nose of concentrated ammonia solutions.

Any zinc or magnesium compound which is soluble in aqueous ammonia can be used in the practice of this invention. Zinc citrate, zinc thiosulfate, and magnesium citrate are particularly satisfactory because of their solubility properties.

An aqueous dispersion of elemental sulfur having reduced corrosive activity toward ferrous metal according to this invention comprises a dispersion of finely divided elemental sulfur in an aqueous solution of ammonia and at least one metal compound, wherein the amount of elemental sulfur is from about 1 to about 70 weight percent based on the total dispersion, the metal compound is selected from the group consisting of soluble zinc and magnesium compounds, the moles of ammonia per gram-atom of metal from the metal compound is from about 0.1 to about 200, and the atomic ratio of metal to sulfur is from about 0.0002 to about 0.1.

The aqueous sulfur dispersion of this invention can be conveniently prepared by mixing an effective amount of an aqueous ammonia solution of the metal compound with a conventional aqueous dispersion of elemental sulfur. The concentration of metal compound in such an inhibitor solution is desirably in excess of about 0.01 molar and preferably in excess of about 0.1 molar, although lower concentrations may also be used. The use of such an inhibitor solution containing a metal compound concentration of less than about 0.01 molar is possible but results in a substantial dilution of the sulfur dispersion which may be undesirable in many cases. Alternatively, the aqueous sulfur dispersion of this invention can be prepared by dispersing the elemental sulfur in an aqueous solution which contains the appropriate amounts of ammonia and metal compound.

The aqueous sulfur dispersion of this invention has a reduced corrosive activity toward ferrous metal and particularly toward carbon steel. In addition, the zinc and/or magnesium of this dispersion serves as a source of these essential nutrients when the dispersion is employed as a fertilizer.

When the sulfur dispersion of this invention is utilized as a fertilizer, an amount is applied to the soil which is sufficient to provide an effective amount of sulfur in comination with zinc and/or magnesium. No special equipment is necessary for application of the dispersion aside from that which is conventionally used for the application of liquid fertilizers. The dispersion is conveniently applied by spray techniques.

The following examples are intended only to illustrate the invention and are not to be construed as imposing limitations on the invention.

EXAMPLE I

To a solution of 27.0 parts of anhydrous citric acid in 60.3 parts of water was slowly added with stirring 8.5 parts of magnesium oxide while keeping the temperature below 52° C. After the addition was completed, stirring was continued until the mixture cooled to 38° C.

Anhydrous ammonia (4.2 parts) was then added to the mixture at a rate such that the temperature remained below 49° C. during addition of the last 50% of the ammonia. The resulting magnesium citrate solution contained 1.2 moles of ammonia per gram-atom of magnesium, had a pH of 9.7, and had a specific gravity of 1.233 at 20° C.

EXAMPLE II

To a solution of 22.0 parts of anhydrous citric acid in 55.6 parts of water was slowly added with stirring 9.8 parts of anhydrous ammonia while keeping the temperature below 32° C. The resulting mixture was cooled to 10° C., and 12.6 parts of zinc oxide was then slowly added while keeping the temperature below 32° C. Stirring was continued until a clear solution was obtained. The resulting zinc citrate solution contained 3.7 moles of ammonia per gram-atom of zinc, had a pH of 9.75, and had a specific gravity of 1.226 at 21° C.

EXAMPLE III

To a mixture of 20.6 parts water and 26.8 parts of ammonium hydroxide solution (28% NH$_3$) was added with stirring 12.6 parts of zinc oxide followed by 40.0 parts of 58-60% aqueous ammonium thiosulfate solution. The resulting zinc thiosulfate solution contained 4.9 moles of ammonia per gram-atom of zinc, had a pH of 11.2, and had a specific gravity of 1.226 at 22° C.

EXAMPLE IV

A series of test dispersions were prepared from Super-Six Sulfur, a commercially available aqueous sulfur dispersion containing 52-54 weight percent sulfur and having a sulfur particle size of from 1 to 5 microns, by mixing with sufficient amounts of the magnesium citrate solution of Example I to give the magnesium to sulfur ratios which are set forth in Table I. A carbon steel test coupon was then weighed and suspended in each test dispersion at 21°-24° C. for 336 hours. At the end of this time, the coupons were removed, cleaned, dried, and reweighed. From the weight loss of each coupon, a corrosion rate, expressed in millimeters per year, was calculated. These results are set forth in Table I.

TABLE I

| Weight of Sulfur Dispersion, g. | Weight of Magnesium Citrate Solution | Atomic Ratio of Magnesium to Sulfur | pH | Corrosion Rate, millimeters/year |
|---|---|---|---|---|
| 100 | 0 | 0 | 8.08 | 2.583 |
| 99 | 1 | 0.0013 | 9.31 | 0.846 |
| 98 | 2 | 0.0026 | 9.45 | 0.0023 |
| 95 | 5 | 0.0067 | 9.52 | 0.0010 |
| 90 | 10 | 0.0142 | 9.61 | 0.0008 |

The results set forth in Table I demonstrate that the corrosive activity toward carbon steel of an aqueous dispersion of elemental sulfur is substantially reduced at a magnesium to sulfur atomic ratio in excess of about 0.001.

EXAMPLE V

A series of test dispersions were prepared from Flo-Sul sulfur, a commercially available aqueous dispersion of elemental sulfur containing 52-54 weight percent sulfur and having a sulfur particle size of from 1 to 5 microns, by mixing with sufficient amounts of the zinc citrate solution of Example II to give the zinc to sulfur ratios which are set forth in Table II. A carbon steel test coupon was then weighed and suspended in each test dispersion at 43° C. for 168 hours. At the end of this time, the coupons were removed, cleaned, dried, and reweighed. From the weight loss of each coupon, a corrosion rate, expressed in millimeters per year, was calculated. These results are set forth in Table II.

TABLE II

| Weight of Sulfur Dispersion, g. | Weight of Zinc Citrate Solution, g. | Atomic Ratio of Zinc to Sulfur | Corrosion Rate, millimeters/year |
|---|---|---|---|
| 100 | 0 | 0 | 22.46 |
| 99.9 | 0.1 | 0.00009 | 25.47 |
| 99.8 | 0.2 | 0.00019 | 20.71 |
| 99.6 | 0.4 | 0.00038 | 17.70 |
| 99.4 | 0.6 | 0.00057 | 6.464 |
| 99.2 | 0.8 | 0.00076 | 0.013 |
| 99.0 | 1.0 | 0.00095 | 0.005 |
| 98.0 | 2.0 | 0.00191 | 0.001 |

The results set forth in Table II demonstrate that the corrosive activity toward carbon steel of an aqueous dispersion of elemental sulfur is substantially reduced at a zinc to sulfur atomic ratio in excess of about 0.0006.

EXAMPLE VI

A series of test dispersions were prepared from Flo-Sul sulfur, a commercially available aqueous dispersion of elemental sulfur containing 52-54 weight percent sulfur and having a sulfur particle size of from 1 to 5 microns, by mixing with sufficient amounts of the zinc thiosulfate solution of Example III to give the zinc to sulfur ratios which are set forth in Table III. A carbon steel test coupon was then weighed and suspended in each test dispersion at 43° C. for 312 hours. At the end of this time, the coupons were removed, cleaned, dried, and reweighed. From the weight loss of each coupon, a corrosion rate, expressed in millimeters per year, was calculated. These results are set forth in Table III.

TABLE III

| Weight of Sulfur Dispersion, g. | Weight of Zinc Thio-Sulfate Solution, g. | Atomic Ratio of Zinc to Sulfur | Corrosion Rate, millimeters/year |
|---|---|---|---|
| 100 | 0 | 0 | 15.99 |
| 99.8 | 0.2 | 0.00019 | 16.72 |
| 99.6 | 0.4 | 0.00038 | 11.12 |
| 99.4 | 0.6 | 0.00057 | 1.458 |
| 99.2 | 0.8 | 0.00076 | 0.0008 |
| 99.0 | 1.0 | 0.00095 | 0.0000 |

The results set forth in Table III demonstrate that the corrosive activity toward carbon steel of an aqueous dispersion of elemental sulfur is substantially reduced at a zinc to sulfur atomic ratio in excess of about 0.0006.

I claim:

1. A sulfur dispersion comprising a dispersion of finely divided elemental sulfur in an aqueous solution of ammonia and at least one metal compound, wherein the amount of elemental sulfur is from about 1 to about 70 weight percent based on the total dispersion, the metal compound is selected from the group consisting of soluble zinc and magnesium compounds, the moles of ammonia per gram-atom of metal from the metal compound is from about 0.1 to about 200, and the atomic ratio of metal to sulfur is from about 0.0002 to about 0.1.

2. The dispersion as set forth in claim 1 wherein the moles of ammonia per gram-atom of metal from the metal compound is from about 1 to about 6.

3. The dispersion as set forth in claim 1 wherein the atomic ratio of metal to sulfur is from about 0.001 to about 0.05.

4. The dispersion as set forth in claim 1 wherein said metal compound is selected from the group consisting of soluble magnesium compounds.

5. A method of fertilizing soil which comprises applying to said soil an effective amount of the dispersion of claim 1.

6. The dispersion as set forth in claim 1 wherein the amount of elemental sulfur is from about 30 to about 70 weight percent based on the total dispersion.

7. The dispersion as set forth in claim 6 wherein the sulfur particles have an average diameter of between about 0.1 and about 10 microns.

8. A sulfur dispersion comprising a dispersion of finely divided elemental sulfur in an aqueous solution of ammonia and at least one metal compound; wherein the amount of elemental sulfur is from about 1 to about 70 weight percent based on the total dispersion; the metal compound is selected from the group consisting of zinc citrate, zinc thiosulfate, and magnesium citrate; the moles of ammonia per gram-atom of metal from the metal compound is from about 0.1 to about 200, and the atomic ratio of metal to sulfur is from about 0.0002 to about 0.1.

9. The dispersion as set forth in claim 8 wherein the moles of ammonia per gram-atom of metal from the metal compound is from about 1 to about 6.

10. The dispersion as set forth in claim 8 or 9 wherein the atomic ratio of metal to sulfur is from about 0.001 to about 0.05.

11. The dispersion as set forth in claim 8 wherein the amount of elemental sulfur is from about 30 to about 70 weight percent based on the total dispersion.

12. The dispersion as set forth in claim 11 wherein the sulfur particles have an average diameter of between about 0.1 and about 10 microns.

* * * * *